US012776209B2

(12) United States Patent
Yedla et al.

(10) Patent No.: US 12,776,209 B2
(45) Date of Patent: Oct. 27, 2026

(54) TRAJECTORY AND TRAFFIC SIGN DATABASE SYSTEM

(71) Applicant: NETRADYNE, INC., San Diego, CA (US)

(72) Inventors: Arvind Yedla, La Jolla, CA (US); Badugu Naveen Chakravarthy, Bengaluru (IN)

(73) Assignee: NETRADYNE, INC., San Diego, CA (US)

(*) Notice: Subject to any disclaimer, the term of this patent is extended or adjusted under 35 U.S.C. 154(b) by 247 days.

(21) Appl. No.: 18/573,682

(22) PCT Filed: Jun. 29, 2022

(86) PCT No.: PCT/US2022/035499
§ 371 (c)(1),
(2) Date: Dec. 22, 2023

(87) PCT Pub. No.: WO2023/278556
PCT Pub. Date: Jan. 5, 2023

(65) Prior Publication Data

US 2024/0290202 A1 Aug. 29, 2024

Related U.S. Application Data

(60) Provisional application No. 63/216,469, filed on Jun. 29, 2021.

(51) Int. Cl.
*G08G 1/0962* (2006.01)
*G06F 16/532* (2019.01)
(Continued)

(52) U.S. Cl.
CPC ....... *G08G 1/09623* (2013.01); *G06F 16/532* (2019.01); *G06F 16/587* (2019.01);
(Continued)

(58) Field of Classification Search
CPC ............. G06V 20/582; G06V 2201/10; G08G 1/09623; G01C 21/3602; G01C 21/3841; G01C 21/3815; G01C 21/3822
See application file for complete search history.

(56) References Cited

U.S. PATENT DOCUMENTS

2017/0073006 A1* 3/2017 Satomura .............. B60W 50/14
2017/0301318 A1* 10/2017 Nishimura ............. B60K 35/22
(Continued)

FOREIGN PATENT DOCUMENTS

EP 2950292 A1 12/2015

OTHER PUBLICATIONS

International Search Report and Written Opinion in International Patent Application No. PCT/US22/35499 dated Sep. 22, 2022, 9 pages.

*Primary Examiner* — Kenneth J Malkowski
(74) *Attorney, Agent, or Firm* — FOLEY & LARDNER LLP

(57) ABSTRACT

Systems and methods are provided for classifying one or more images of video data captured by a camera in a vehicle. The classification involves a detection of a traffic control device, such as a U-Turn sign, in image data. The classification further involves querying a database with a location of the vehicle from which the traffic control device was observed. In some embodiments, the database contains entries for various types of traffic control devices from a family of traffic control devices, where each type of traffic control device in the family has a similar visual appearance. The database query may therefore help disambiguate the visually perceived traffic control device at a particular location. Embodiments may be incorporated into navigation or driver safety systems.

19 Claims, 10 Drawing Sheets

| First segment | Second Segment | Applicable U-Turn Sign | U-Turn Sign Type | Condition |
|---|---|---|---|---|
| 404 | 406 | Yes | No U-Turn | 10am - 12pm |
| 414 | 416 | None | None | None |

(51) Int. Cl.
*G06F 16/587* (2019.01)
*G06V 20/56* (2022.01)
*G06V 20/58* (2022.01)
*G08G 1/04* (2006.01)

(52) U.S. Cl.
CPC .......... *G06V 20/582* (2022.01); *G06V 20/588* (2022.01); *G08G 1/04* (2013.01)

(56) References Cited

U.S. PATENT DOCUMENTS

2019/0279007 A1 9/2019 Zinner et al.
2020/0042813 A1 2/2020 Nagao et al.
2021/0089796 A1* 3/2021 Lu ........................ G06V 20/582

* cited by examiner

| Safety Category | Total | w/ Video | Audited | Precision |
|---|---|---|---|---|
| Following Distance | 21382 | 5745 | 2404 | 99% |
| Speeding Violations | 108681 | 7718 | 3392 | 99% |
| Stop Sign Violations | 292496 | 11830 | 6769 | 98% |
| Seatbelt Compliance | 191924 | 7935 | 4370 | 98% |
| Driver Distraction | 55062 | 5708 | 2377 | 95% |
| Traffic Light Violations | 929 | 468 | 916 | 82% |
| U-Turn | 337 | 174 | 332 | 81% |

FIG. 1

| Reason Codes | Week 1 | Week 2 | Week 3 |
|---|---|---|---|
| U-turn only sign detected | - | 17% | 8% |
| No U-turn on certain day/time | 35% | 26% | 44% |
| Wrong board detected | 13% | 19% | 6% |
| Driver took U-turn after travelling some distance from U-turn sign | 15% | 7% | 10% |
| U-turn sign for heavy vehicles detected | 20% | 13% | 21% |
| U-turn of other lane detected | 13% | 15% | 8% |
| Others | 5% | 3% | 3% |

FIG. 2

| First Segment | Second Segment | Applicable U-Turn Sign? | U-Turn Sign Type |
|---|---|---|---|
| 304 | 306 | No | No U-Turn |
| 314 | 316 | Yes | No U-Turn |

| First segment | Second Segment | Applicable U-Turn Sign | U-Turn Sign Type | Condition |
|---|---|---|---|---|
| 404 | 406 | Yes | No U-Turn | 10am - 12pm |
| 414 | 416 | None | None | None |

| First segment | Second Segment | Applicable U-Turn Sign | U-Turn Sign Type | Condition |
|---|---|---|---|---|
| 404 | 406 | Yes | No U-Turn | 10am - 12pm |
| 414 | 416 | None | None | |

| First Segment | Second Segment | Applicable U-Turn Sign? (Assumed Visible if in This Database) | U-Turn Sign Type |
|---|---|---|---|
| 404 | 406 | Yes | No U-Turn |
| 404 | 408 | No | No U-Turn |

| First Link-ID | Second Link-ID | Applicable U-Turn Sign? | U-Turn Sign Type | Condition |
|---|---|---|---|---|
| 604 | 606 | Yes | No U-Turn if Truck | No U-Turn if Operating a Truck |

| First Segment | Second Segment | Applicable U-Turn Sign? | U-Turn Sign Type |
|---|---|---|---|
| 704 | 706 | No | None |

| First Segment | Second Segment | Applicable U-Turn Sign? | U-Turn Sign Type |
|---|---|---|---|
| 804 | 806 | False Alarm | False Alarm: No Parking |

TRAJECTORY AND TRAFFIC SIGN DATABASE SYSTEM

CROSS REFERENCE

This application is a U.S. National Phase Application under 35 U.S.C. § 371 of International Patent Application No. PCT/US2022/35499, filed on Jun. 29, 2022, which claims the benefit of and priority to U.S. Provisional Patent Application No. 63/216,469, filed on Jun. 29, 2021, and entitled TRAJECTORY AND TRAFFIC SIGN DATABASE SYSTEM, the contents of which are incorporated herein by reference in their entireties.

BACKGROUND

Field

Certain aspects of the present disclosure generally relate to systems and methods of driving monitoring. Certain aspects are directed to systems and methods for improving the operation of a vehicle in the vicinity of traffic control devices, such as traffic signs. In addition, certain aspects are particularly directed to systems and methods for constructing a geolocated database of permissible and prohibited U-Turn maneuvers. In addition, certain aspects are particularly directed to improving U-Turn driving behavior monitoring systems and methods, including by using a geolocated database.

Background

Internet-of-things (IOT) applications may include embedded machine vision for intelligent driver or driving monitoring systems (IDMS), advanced driving assistance systems (ADAS), autonomous driving systems, camera-based surveillance systems, smart cities, and the like. A user of IOT systems in a driving context may desire accurate scene comprehension and driving behavior recognition in the vicinity of substantially all traffic control devices. Scene comprehension may be considered a form of image recognition that may, in some cases, involve recognition of objects within an image.

Real-world deployments of such systems may face challenges, however, due to several factors. One class of challenges relates to variability in the placement of traffic control devices, such as U-turn signs, relative to driving locations where the sign is intended to apply. Another class of challenges relates the use of subtle distinctions in road signage, wherein small differences in the visual appearance of two signs may correspond to very different or even opposite meanings for traffic control.

The present disclosure is directed to methods that may overcome challenges associated with deploying driving systems, which may include IDMS, ADAS, or autonomous driving systems that are expected to work in all geographical locations in a country.

SUMMARY

Certain aspects of the present disclosure generally relate to providing, implementing, and using a method of creating and/or using a road location or vehicle trajectory and traffic sign database. Certain aspects are directed to quickly and accurately identifying challenging real-world variations in road scenes, wherein a detected traffic control device may correspond to more than one traffic control device of a visually similar family of traffic control devices. A family of traffic signs that control U-turn driving behaviors, for example, may include a traffic sign that indicates that a U-turn is permissible and a traffic sign that indicates that a U-turn sign in not permissible, and the two signs may appear similar to each other in certain scenarios. Certain aspects are further directed to constructing and/or using databases of observed traffic control devices, so that precision and recall of the driving system may improve into the increasingly challenging cases that one encounters on the long-tail distribution of traffic phenomena.

Certain aspects of the present disclosure provide a method. The method generally includes detecting, by at least one processor of a computing device, a traffic control device in an image, wherein the image was captured by a camera, and wherein the camera is mounted on or in a vehicle; determining, by the at least one processor, a location of the vehicle; querying, by the at least one processor, a database to produce a query result, wherein the query is based on the location of the vehicle; and determining, by the at least one processor, whether the traffic control device does not apply to the vehicle or the traffic control device does apply to the vehicle based on the query result.

Certain aspects of the present disclosure provide a computer program product for classifying video data captured by a camera in a vehicle. The computer program product generally includes a non-transitory computer-readable medium having program code recorded thereon, the program code comprising program code to detect a traffic control device in an image, wherein the image was captured by a camera, and wherein the camera is mounted on or in the vehicle; determine a location of the vehicle; query a database to produce a query result, wherein the query is based on the location of the vehicle; and determine whether the traffic control device does not apply to the vehicle or the traffic control device does apply to the vehicle based on the query result.

BRIEF DESCRIPTION OF DRAWINGS

FIG. 1 is a table comprising precision values for various categories of safety alerts.

FIG. 2 is a table comprising error mode analysis for putative U-Turn safety alerts recorded in three one-week periods.

DETAILED DESCRIPTION

Figure 3A:
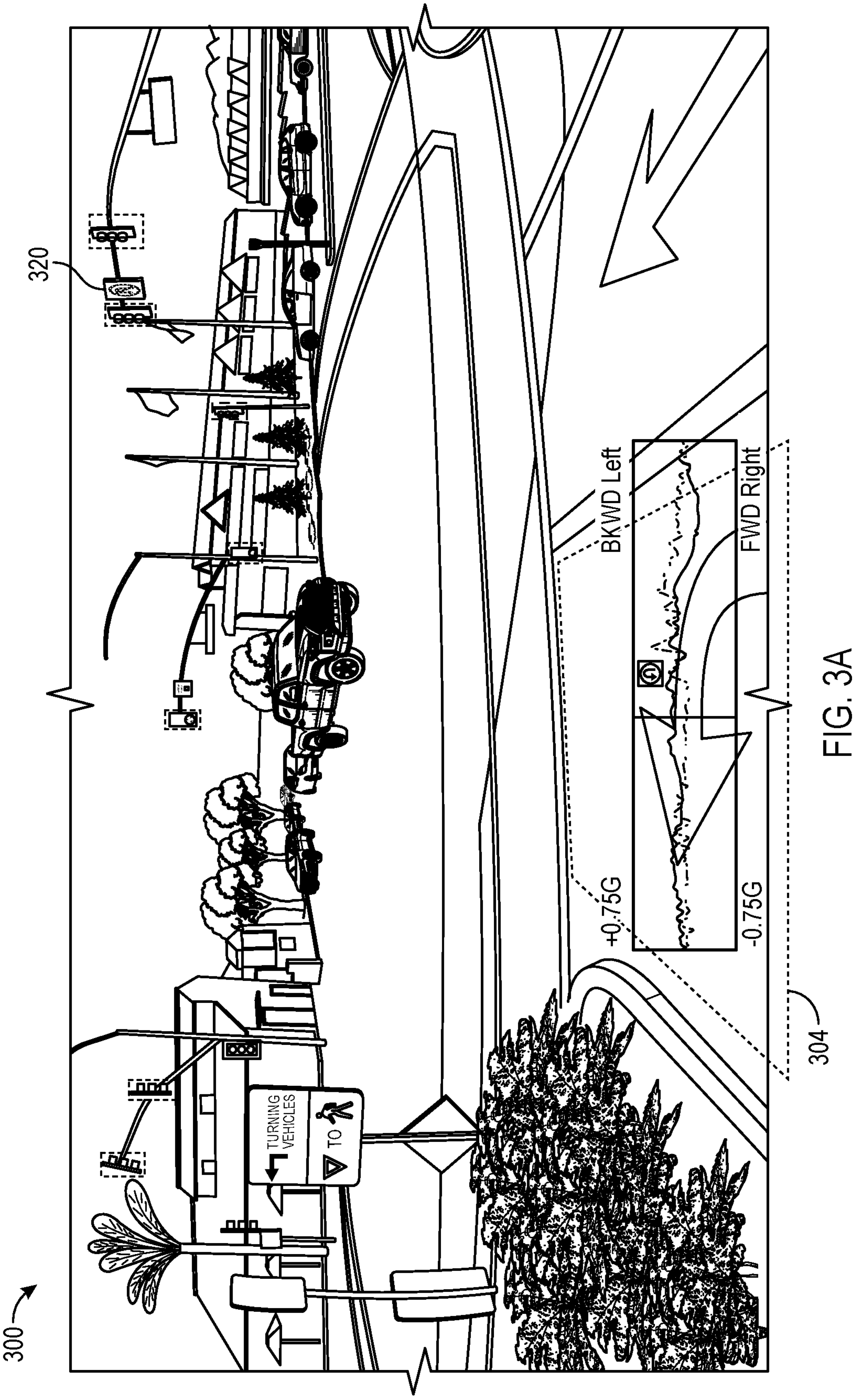
FIG. 3A is an image depicting a putative U-Turn event in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Distributed Video Search

Certain aspects of the present disclosure are directed to searching visual data, such as video streams and images, captured at one or more devices. The number of devices may be denoted as N. The value of N may range from one (a single device) to billions. Each device may be capturing one or more video streams, may have captured one or more video streams, and/or may capture one or more video streams in the future. It may be desired to search the video streams in a number of these devices. In one example, a user may desire to search all of the captured video streams in all of the N devices. In another example, a user may desire to search a portion of the video captured in a portion of the N devices. A user may desire, for example, to search a representative sample of devices in an identified geographical area. Alternatively, or in addition, the user may desire to search the video captured around an identified time.

A search query may include an indication of specific objects, objects having certain attributes, and/or a sequence of events. Several systems, devices, and methods of detecting objects and events (including systems and methods of detecting safe and unsafe driving behaviors as may be relevant to an IDMS system) are contemplated, as described in PCT application PCT/US17/13062, entitled "DRIVER BEHAVIOR MONITORING", filed 11 Jan. 2017, which is incorporated herein by reference in its entirety.

Examples of distributed video search may include an intelligent driver monitoring system (IDMS), where each vehicle has an IDMS device and the user/system may search and retrieve useful videos constructing a database in support of driver safety functionality. An example of useful videos may be videos in which traffic control devices may appear partially or fully obscured, such as videos of road scenes with visible snow, videos in which there are visible pedestrians, videos in which there are visible traffic lights, or videos corresponding to certain patterns of data on non-visual sensors. Examples of patterns of data in non-visual sensors may include inertial sensor data corresponding a U-Turn maneuver by a vehicle, which is a change of direction on a roadway. A database may be constructed based on detected U-Turn maneuvers, detected U-Turn signage, and combinations thereof. Other examples of non-visual sensor data may include system monitoring modules. A system monitoring module may measure GPU utilization, CPU utilization, memory utilization, temperature, and the like. In some embodiments, a video search may be based solely on data from non-visual sensors, which may be associated with video data. Alternatively, or in addition, a video search may be based on raw, filtered, or processed visual data.

In one embodiment, the number of devices receiving a search query may be limited to a subset of the available devices. For example, the cloud may transmit the search query to devices that are in a particular geographic location. In some embodiments of the present disclosure, the location of a device where video data is stored may be correlated with the location where the video data was captured. In one example, a search query may be broadcast from a number of cell phone towers corresponding to the desired location of the search. In this example, the search query may be restricted to the devices that are within range of the utilized cell phone towers. In another example, the cloud server may keep track of the location of each connected device. Upon receiving a search query, the cloud server may limit the transmission of the search queries to devices that are in a given geographical region. Likewise, the cloud server may restrict the transmission of the search query to devices that were in a given geographical region for at least part of a time period of interest.

Location-Based Distributed Search

In another embodiment, a video or image search request may specify a particular location. For example, a search may request images of all vehicle trajectories in the vicinity of a traffic control device, such as a traffic sign, at a particular time. According to certain aspects of the present disclosure, certain location specific search efficiencies may be realized. For example, a search request may be sent to devices embedded within security cameras on or near the traffic control device in question. Furthermore, a search request may be sent to traffic lights or gas stations in the vicinity of the traffic control device if there were enabled devices at those locations that may have collected video data, as described above. In addition, a search request may be sent to all vehicle-mounted devices that may have travelled near the traffic control device in question around the time of interest.

A centralized database may be partitioned so that videos from different countries or regions are more likely to be stored in data centers that are geographically nearby. Such a partitioning of the data may capture some of the efficiencies that may be enabled according to the present disclosure. Still, to enable a search of one traffic control device and its surrounding environment, it may be necessary to store video data from substantially all traffic control devices that a user might expect to search. If the number of search requests per unit of recorded video is low, this approach could entail orders of magnitude more data transmission than would a system of distributed search in which the video data is stored at locations that are proximate to their capture. In the latter system, only the video data that is relevant to the search query would need to be transferred to the person or device that formulated the query. Therefore, in comparison to a system that relies on searching through a centralized database, a system of distributed video search may more efficiently use bandwidth and computational resources, while at the same time improving the security and privacy of potentially sensitive data.

Distributed Video Search for Rare Event Example Mining

Certain aspects of the present disclosure may be directed to visual search that is based on certain objects or events of interest without regard to the location where they were collected. Likewise, a search query may request examples of a particular pattern in visual data, such as visual data, which may be images or image sequences, corresponding to on-device detection of traffic control devices belonging to particular families of traffic control devices. Database construction based on such visual searches and may further request that the examples represent a range of geographical locations.

While machine learning has been advancing rapidly in recent years, one hindrance to progress has been the availability of labeled data. In safety critical applications such as autonomous driving, for example, a particular issue relates to the availability of data that reflects rare but important events. Rare but important events may be referred to as “corner cases.” Control systems may struggle to adequately deal with such events because of the paucity of training data. Accordingly, certain aspects of the present disclosure may be directed to more rapidly identifying a set of training images or videos for a training sample in the context of computer vision development. Likewise, such systems may be improved by constructing and maintaining a database of geolocated visual observations, since such a database may be used to improve the precision of scene comprehension at the recorded locations.

In one example, it may be desirable to automatically detect when a driver performs a U-Turn. A deep learning model may be trained to detect such activity from a set of labeled video and associated positional sensor data captured at cars at times that the driver performed a U-Turn or driving maneuvers that resemble a U-Turn.

A U-Turn detection model may be formulated and deployed on devices that are connected to cameras in cars. The device may be configured to detect that a driver has made a U-Turn in the presence of a traffic sign that controls U-Turn behavior in the vicinity. Such traffic signs may expressly prohibit a U-Turn (No U-Turn traffic sign) or expressing permit (U-Turn permitted traffic sign) a U-Turn in the vicinity of the sign. In the early development of the detection model, there may be many false alarms. For example, U-Turns may be incorrectly detected, or the U-Turn maneuver in the presence of a U-Turn sign may be incorrectly classified as a U-Turn violation due to a misclassification of the traffic sign. Thus, a putative detection of a U-Turn in the presence of a No U-Turn sign may actually correspond to a safe and normal driving behavior because the detection of the traffic control device as a “No U-Turn” sign was erroneous. In one approach to developing such a detection model, a set of devices with the deployed model may transmit detects (both true and false) to a centralized server for a period of two weeks. Based on the received detections, the model may be iteratively refined and re-deployed in this manner.

In addition, or alternatively, in accordance with certain aspects of the present disclosure, a U-Turn detection model may be deployed on devices. Rather than wait for two weeks, however, the U-Turn detection model could be made part of a search query to each of the devices. Upon receiving the search query, each device may reprocess its local storage of data to determine if there have been any relevant events in the recent past. For example, the device may have a local storage that can accommodate two to four weeks of driving data. In comparison to the first approach described above which had two-week iteration cycles, this approach using distributed video search on the locally stored data of edge devices could return example training videos within minutes or hours.

Likewise, subsequent iterations of the detection model may be deployed as search requests to a non-overlapping set of target devices. In this way, each two-week cycle of machine learning development could substantially eliminate the time associated with observing candidate events. Similarly, subsequent iterations of road scene comprehension logic may feature updates to a geolocated U-Turn sign family database. The comprehension logic may rely on the updated database to improve precision at previously (or sufficiently recently, etc.) visited locations.

Furthermore, rather than re-processing all of the video stored on each local device, the search query may be processed based on stored descriptors, as described above. Likewise, a search query may entail re-processing a sample of the locally stored videos, in which the subsample may be identified based on a search of the associated descriptor data.

Constructing a Database U-Turn Maneuvers Between Road Segments

Certain aspects of the present disclosure are directed to constructing a database of permissible and prohibited U-Turn maneuvers organized by road segment identifiers. Road segment identifiers may indicate portions of a road in which all or substantially all traffic tends to move in one direction. For example, a two-lane road supporting two directions (eastbound and westbound) of traffic may be identified by two road identifiers. The first road segment identifier may be associated with eastbound traffic and the second road segment identifier may be associated with westbound traffic. Road segment identifiers may extend over a behaviorally relevant distance. For example, road segment identifiers may extend up to an intersection, so that if a vehicle travels eastbound through an intersection, the driver will travel from a portion of road associated with a first road segment identifier, and then to a portion of road associated with a third road segment identifier, where the third road segment identifier is associated with a portion of the road on the far (Eastern) side of the intersection. Likewise, if a driver performs a U-Turn at the intersection, he may travel from the portion of the road associated with the first road segment identifier (which is a portion of road associated with eastbound traffic), and to a portion of the road associated with the second road segment identifier (which is a portion of the same road and on the same side of an intersection as the first road segment, but that is associated with westbound traffic).

A driving monitoring system may detect a U-Turn maneuver in various ways. For example, a driving monitoring system may integrate inertial signals to determine that a monitored vehicle make an approximately 180-degree turn in a short time span. Alternatively, or in addition, a driving monitoring system may process a sequence of GPS position and/or heading estimates and thereby determine that a U-Turn was performed. In some embodiments, a driving monitoring system may include a camera system, which may capture images of a scene in front of the vehicle. Processing of image or video data may result in a detection of a traffic sign indicating the permissibility of U-Turns in the vicinity. Common U-Turn signs include "No U-Turn" signs, "U-Turn permitted" signs, and "Conditional U-Turn signs" which may be of either of the preceding types, and may further indicate a condition such as a time of day or days of the week when U-Turns are permitted or prohibited, and/or one or more vehicle class to which the sign applies. For example, a U-Turn may only apply to trucks, may apply to all vehicles except buses, and the like. To determine if such a U-Turn sign applies to the vehicle from which the sign was detected, it may be necessary to determine the class of the vehicle in question.

As part of a driving monitoring system, U-Turn behavior may be monitored. In one example, detecting a U-Turn maneuver in the presence of an applicable "No U-Turn" sign may be detected as a safety violation. Upon detecting such a safety violation, a system may be configured to transmit a video record of the event and/or a data representation of the event to a remote server, to a smartphone app, and the like. Such events may then be incorporated into a driver training program to modify habitual driving behavior in the vicinity of U-Turn signs, may be incorporated into a testing regimen for an autonomous vehicle controller, and the like.

Due to the variations in U-Turn traffic signs, as well as the conditions that may be associated with them, and in further view of challenges associated with properly determining that a detected U-Turn traffic sign is applicable to a vehicle from which the U-Turn traffic sign was observed, there may be significant challenges to accurately detecting driving safety violations with respect to U-Turn traffic signs. FIG. 1 is a table that includes seven Safety Alert categories and the Total Alerts, Alerts With Video, Audited Alerts, and Precision calculated as a percentage in a given week as tracked by a driver device system used in a study. The precision percentage corresponding to the U-Turn Safety Alert category is the lowest among the precision percentage of the six remaining Safety Alert categories, which include Driver Distraction, Following Distance, Sign Violations, Traffic Light Violations, Seatbelt Compliance, and Speeding Violations. It may also be noted from Table 1 that U-Turn violations are more rarely observed in comparison to Traffic Light violations, which are in turn, rarely observed with respect to other types of observable safety violations in the study. Based on these observations, certain aspects of the present disclosure were developed to improve precision of U-Turn Safety Alerts. Although the subsequent discussion is described with respect to U-Turn traffic signs, certain aspects of the present disclosure may be applied to other types of safety alerts (such as safety alerts in the vicinity of traffic lights), or to other vehicular systems.

FIG. 2 is a table that includes seven Reason Codes that describe types of U-Turn violation errors that were falsely detected by the driver monitoring system used in the aforementioned study. The right-most columns of the table in FIG. 2 provide percentage values, wherein the value indicates the percentage of errors that are of the corresponding type. The Reason Codes are: U-Turn only sign detected, No U-Turn on certain day/time, Wrong board detected, Driver took U-Turn after travelling some distance from U-Turn sign, U-Turn for heavy vehicles detected, U-Turn of other lane detected, and Others. For example, the Reason Code "No U-Turn on certain day/time" accounted for 44% of all U-Turn sign related errors in Week 3.

As shown in the Table in FIG. 1, driver monitoring devices involved in the study detected 337 U-Turn "alerts" (putative U-Turn violations) in Week 3. Of these, video data were retrieved for 174 of these 337 putative alert events. 332 of these 337 were "audited," meaning that they were reviewed for accuracy. In this example, accuracy could be assessed without video data if the U-Turn was detected at a location associated with a known "No U-Turn" sign or a similar sign in the same family of traffic control devices. That is, if multiple U-Turn maneuvers are detected from a given location, and the presence of a U-Turn sign from the family of visually similar signs has already been validated at the location both before and after an event for which video data was not retrieved, the video for the event for which video data was not retrieved need not be reviewed to assess the accuracy of the traffic sign classification. Rather, the event may still be reviewed as a true or false detection of a "U-Turn in the presence of a No U-Turn sign" event based on the detection of the U-Turn maneuver itself and in further reference to the geolocated database in which the type of U-Turn sign at that location has been stored. Video data may also have been used to verify that the U-Turn was performed in the presence of a detected U-Turn sign. In this study, putative U-Turn events were detected based on processing that occurred on a device that is proximate to a camera from which the U-Turn sign could be visually detected. Contemporaneous geolocation was also stored and transmitted to a remote (i.e., cloud) server for the analyses presented herein. Of the 332 putative violations, an 81.33% precision was recorded, meaning that 270 of the 332 putative violations were indeed U-Turn violations, that is, detected driving events for which the driver of the monitored vehicle performed a U-Turn in the presence of an applicable No U-Turn sign.

The remaining 62 putative violations were "false positives." In most of these false positive cases, the driver was correctly determined to have performed a U-Turn and a U-Turn sign was also correctly determined to be visible in video data captured around the time of the U-Turn maneuver. However, for various reasons, some of which are detailed below, the U-Turn maneuver was not a U-Turn violation.

Returning again to the Table in FIG. 2, of the audited putative U-Turn alerts in the aforementioned study, 44% of the errors (27 of 62) were of the type "No U-Turn on certain day/time." In addition, 10% of the errors (6 of 62) were of the type "Driver took U-Turn after travelling some distance from U-Turn sign." Further, 8% of the errors (5 of 62) were of the type "U-Turn of other lane detected." This type of error mode analysis may be used to fashion solutions to the problems presented by each of these individual cases. Examples of each of these three highlighted problematic scenarios are described in the following, along with detailed techniques for overcoming these challenges and thereby improving the precision of a vehicle safety system.

Solutions that increase the overall precision of road scene classification, particularly with respect to permissible vehicle trajectories in the vicinity of traffic signs, may have multiple technical effects. First, increased precision may improve a navigational system. After a driver misses a turn, for example, a navigational system may indicate where along the current road a U-Turn is or is not permissible. Second, increased precision may improve a safety system that acts to improve habitual driving behaviors. For example, a safety system may issue audible feedback after a driver completes a U-Turn at a location where U-Turns are not permitted. Such immediate feedback may act on brain circuits that underly habitual behaviors and thereby lessen the valence of an unsafe driving habit. Third, increased precision can make a driver assistance system more effective. If a driver slows in a road way where other drivers tend to perform U-Turns at an elevated rate, but which is governed by a No U-Turn sign, the driver assistance system could alert the driver prior to making a U-Turn that no U-Turn is permitted at that location, and thereby nudge the driver to avoid making an unsafe driving maneuver at that location.

FIG. 3A is an image 300 captured from a camera that is mounted to the windshield of a vehicle. After the time that this image 300 was captured, the vehicle proceeded to make a left turn from the left turn only lane as permitted by a green traffic light. A "not-for-me" No U-Turn sign 320 is detected in the intersection. The sign 320 is attached to a pole that also supports two traffic lights. The traffic lights and the sign 320 are all applicable to cross-traffic from the perspective of the vehicle from which the image 300 was captured, when that vehicle is on road segment 304. In this depiction, road segment 304 is illustrated as occupying the left-turn lane in front of the vehicle. In some embodiments, the road segment 304 would occupy all lanes of traffic that are associated with a particular direction of travel (or, as here, for all vehicles oriented in the same direction as the vehicle from which the image 300 was captured). Given the position of the detected No U-Turn sign, it is apparent that the No U-Turn sign is applicable for a different road than the one the vehicle was driving on. Thus, even though the driver monitoring system detected a U-Turn alert in this instance, it was a false alarm. Referring again to the Table in FIG. 2, the scene illustrated in FIG. 3A corresponds to an error of type, "U-Turn of other lane detected."

Figure 3B:
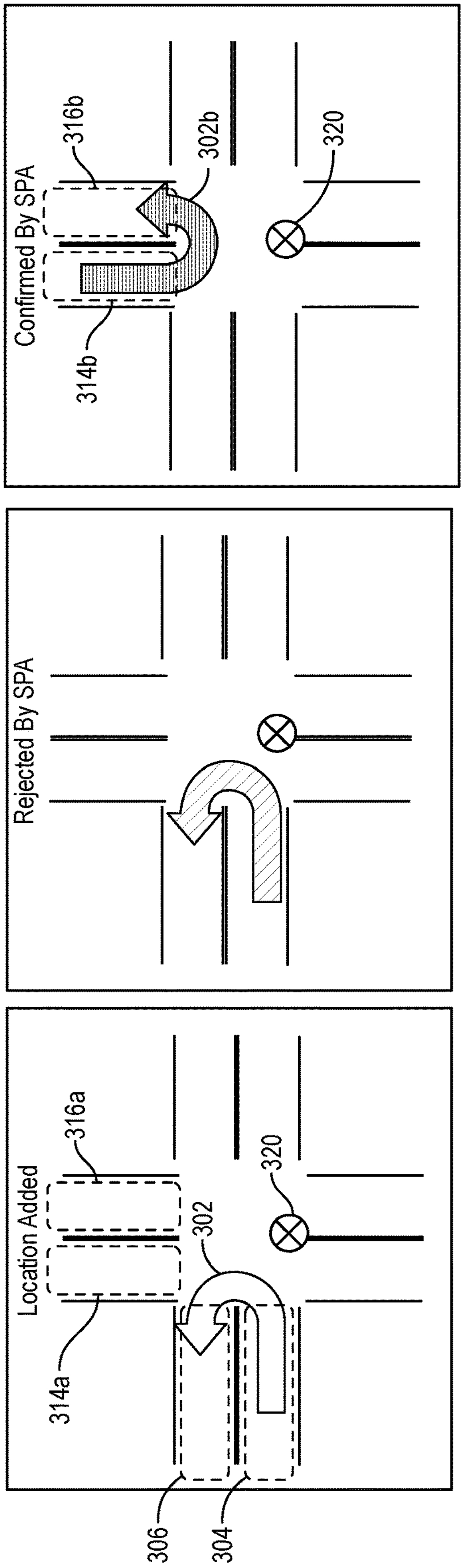
FIG. 3B is a schematic diagram and example database entries in accordance with certain aspects of the present disclosure.

FIG. 3B includes a database listing first road segment identifier, second road segment identifier, Applicable U-Turn Sign, and U-Turn Sign Type. A road segment identifier may indicate a road segment with one direction of travel and may further be associated with (linked to) other road segment identifiers to which a driver may travel from the first road segment identifier. While the driver may travel from a given first road segment identifier to a second road segment identifier, in some cases, such a trajectory would be impermissible, as in the case where the trajectory would be a U-Turn and a No U-Turn sign governs the location at which the U-Turn is performed. As illustrated in the upper left diagram, first road segment 304 and second road segment 306 may refer to two segments of a road for which traffic travels in opposite directions. A travel path 302, which begins in road segment 304 and continues to road segment 306 will typically be in the form of a U-Turn. In this example, a U-Turn is permitted at this location. A No U-Turn sign 320 is visible from a vehicle at road segment 304 (as illustrated in FIG. 3A), but that U-Turn sign is not applicable to the travel path 302. Instead, the U-Turn sign 320 applies to U-Turns that are performed from road segment 314*a* to road segment 316*a*.

These "rules of the road" may be collected together in a database format in accordance with certain aspects of the present disclosure. In one embodiment, video data, which may include the image 300 associated with the U-Turn false alarm alert, may be reviewed by a human reviewer and then two entries may be made into a database. For example, a driver may interact with video captured around the time of the vehicle event via a smartphone app. The driver may indicate that the vehicle event should be reviewed and/or may reject the automated characterization of the vehicle event. Alternatively, or in addition, such events may be further processed by a neural network that has been trained on examples of true positive and false positive U-Turn violation video data. The table in the bottom right corner of FIG. 3B illustrates a database schematic. Here, the first road segment 304 and the second road segment 306 may be added in each of the first two columns, respectively. In the third column entry of the same first row is an indication that an observable U-Turn sign from that location does not apply to the travel path that comprises road segment 304 and road segment 306. In this example, a fourth column further indicates that the U-Turn sign that is visible is of the type "No U-Turn" sign, which may thus be distinguished from a "U-Turn permitted" sign, which may have a similar visual appearance (and which may only differ, for example, in that the former U-Turn sign type has a circle with a diagonal line through it in front of a U-shaped arrow, while the latter has only the U-shaped arrow. Other database schemas are also contemplated. For example, the database may only maintain a record of U-Turn signs of the "No U-Turn" variety, and thus would not maintain a record of observed "U-Turn permitted" signs. Likewise, contemplated database schemas would keep track of whether a U-Turn is prohibited at that intersection and travel trajectory 302. Still, in this example embodiment, there are separate columns indicating whether an observable U-Turn sign is applicable to a travel trajectory specified by the first two rows, and furthermore the sign type. By combining entries for "No U-Turn" and "U-Turn permitted" signs into the same database, detections of signs belonging to the family of traffic signs governing U-Turns (as well as other signs that may have a similar appearance) may be resolved, even if there is some uncertainty as to which traffic sign type within the family was detected at a given location.

Based on the vehicle event illustrated in FIG. 3A, two rows may be added to the database. The second row in this case includes Road segment identifiers 314 and 316. Road segment identifier 314 may correspond to the direction of traffic nearest the vehicle having the camera in FIG. 3A and from the left side of cross traffic. Likewise, road identifier 316 may be the far side of that same road. Based on the observation made above, the second road may be added to indicate that U-Turns from the road segments corresponding to road segment identifiers 314 and 316 are not permitted at this intersection.

These same facts may be added to the database in an automated fashion. For example, a visual perception engine may be able to determine that the No U-Turn sign is applicable to trajectories such as trajectory 302*b* illustrated in the bottom left panel. Here, the bottom left panel illustrates a travel path 302*b* observed at the same location but at a different time or from a different vehicle. For this travel path 302*b*, the observable No U-Turn Sign 320 is applicable and indicates that U-Turn 302*b* was a violation.

According to certain embodiments, a database look up may be performed in the cloud. The example illustrated in the bottom left panel, from road segment 314*b* to road segment 316*b* may be "confirmed" by a "Second Pass Analytics" (SPA). SPA may refer to a "microservice" that may receive trajectory data and then determine an associated sequence of road segments. The SPA service may then query the database as just described, and may then determine that a U-Turn was or was not permitted. In this example, a subsequent U-Turn as illustrated in the top right panel would be "rejected" by SPA, meaning that the putative alert would be determined to be a "false alarm" and therefore, not a violation. Future U-Turns like the one depicted in the bottom left, however, would be "confirmed" by SPA, meaning that they would be included in a set of U-Turn violations that may be presented to a driver and/or safety manager in the context of an Intelligent Driving Monitoring System, may be used to determine the appropriateness of an autonomous vehicle controller, provide a navigational instruction, and the like.

Figure 4A:
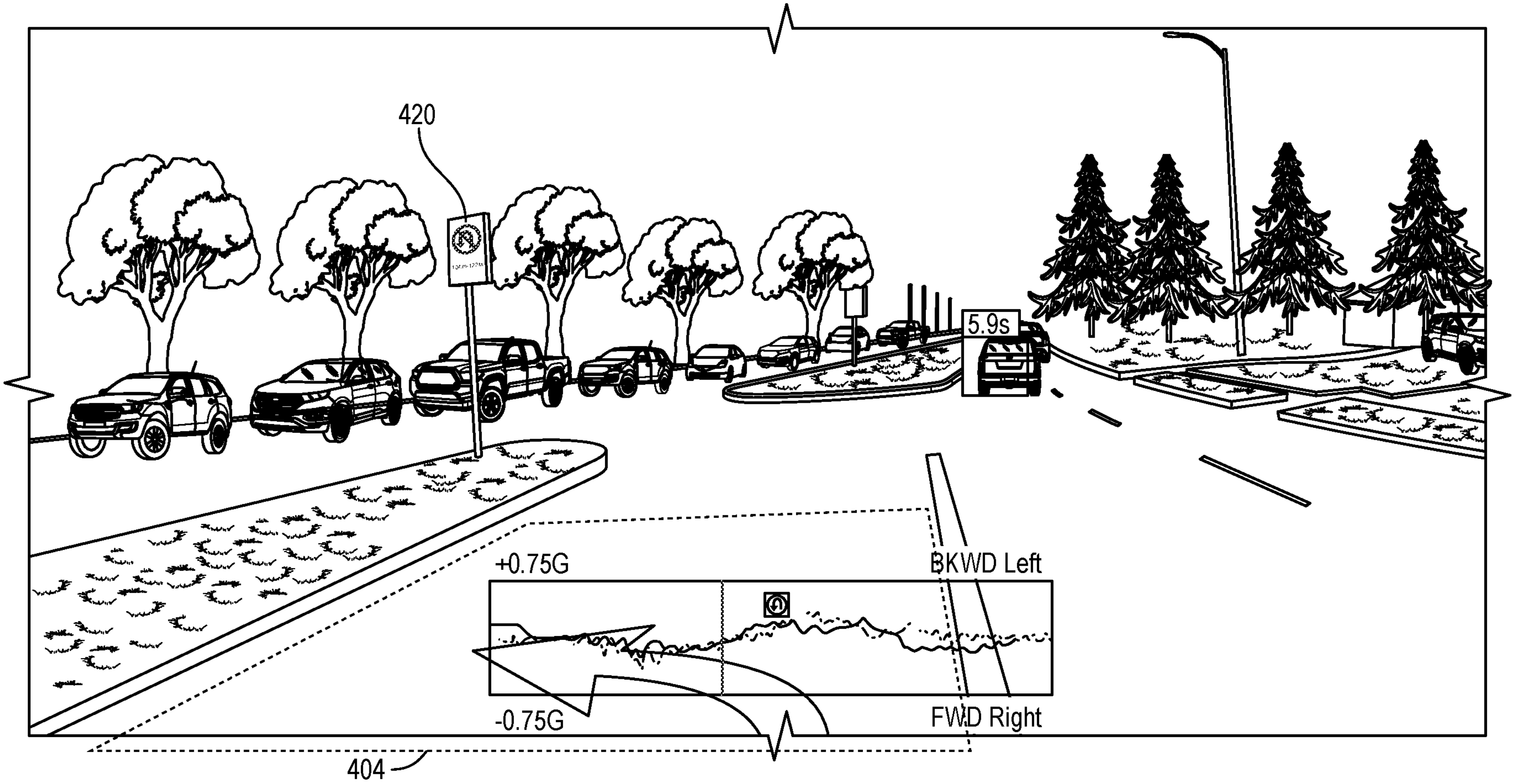
FIG. 4A is an image depicting a putative U-Turn event in accordance with certain aspects of the present disclosure.

FIG. 4A is an image 404 captured from a camera that is mounted in the windshield of a vehicle in the left turn only lane. A No U-Turn sign 420 is detected in a break in a median. A break in a median may be a natural location where a road segment identifier may terminate, since it is possible for a driver to legally drive across the break in the median at that location. The No U-Turn sign in this example is applicable for the road in which vehicle was driving. In particular, the No U-Turn sign 420 in this example applies to vehicles that are driving in road segment 404. The No U-Turn sign is also a "conditional" U-Turn sign in the sense that is prohibits U-Turns only at specified times of day.

Figure 4B:
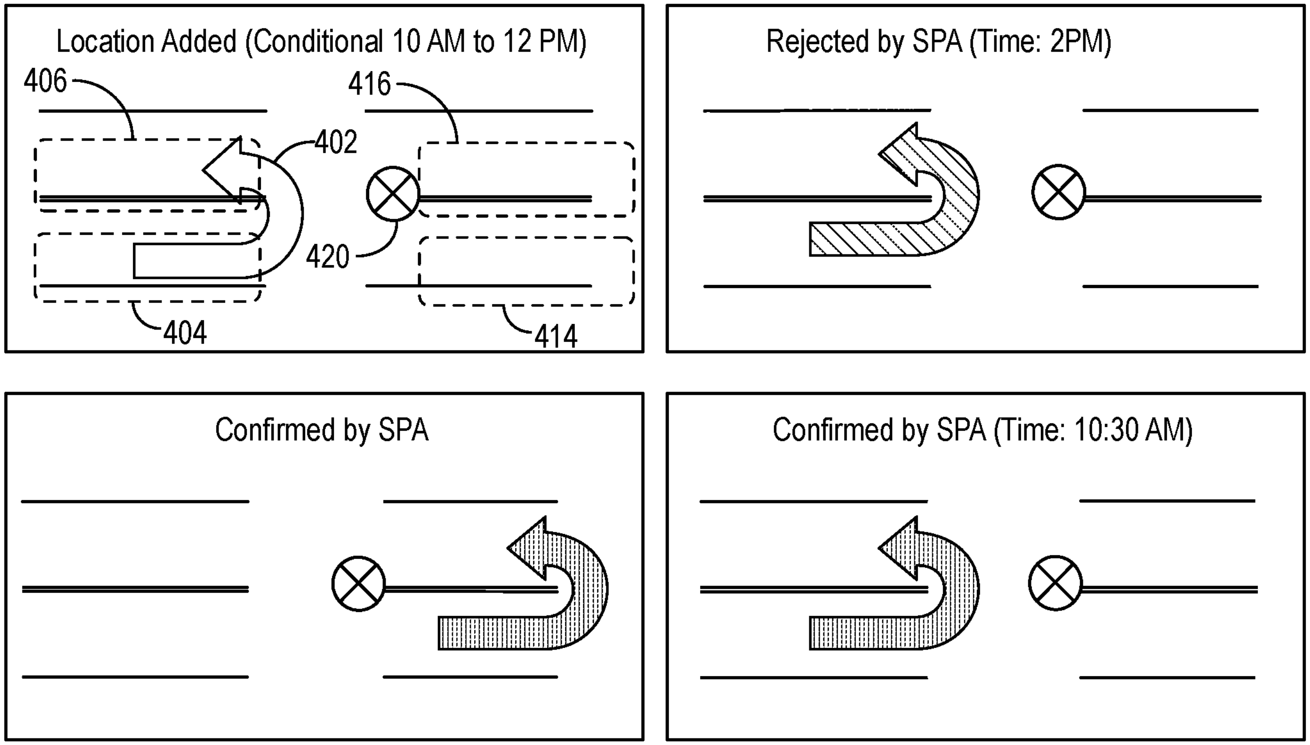
FIG. 4B is a schematic diagram and example database entries in accordance with certain aspects of the present disclosure.

The top left panel of FIG. 4B illustrates a diagram of the scene illustrated in FIG. 4A. Here, a path of travel 402 was completed from road segment 404 to road segment 406. Based on the visual characteristics of the No U-Turn sign, a time of day condition may be added, such as "Conditional 10 am to 12 pm." These observations may then be codified into a database as shown.

Here, the database schema, relative to the one shown in FIG. 3B, includes a column for "Condition," along with other columns for first road segment identifier, second road segment identifier, Applicable U-Turn Sign, and U-Turn Sign Type. As per the entries in the first row, a vehicle trajectory from first road segment identifier 404 to second road segment identifier 406 corresponds to a location where a U-Turn is conditionally permitted, based on the day and/or time of day. The observable sign is a "No U-Turn sign" and the relevant condition is 10 am-12 pm. Based on these entries, subsequent U-Turns observed at the same location can be either rejected (top right) or confirmed (bottom right), depending on the time of day. The U-Turn depicted in the top right panel was observed at 2 pm, which is outside of the specified condition, and is therefore permissible (or at least not explicitly prohibited by this U-Turn sign). In contrast, the U-Turn depicted in the bottom right panel was observed at 10:30 am, a time that is within the condition. This U-Turn would thus be confirmed with reference to the database. Similarly, a driver assistance display or navigational system may indicate whether a U-turn is permissible at that location by querying the database and in further reference to the time of day and/or day of week, as appropriate.

Another error mode is illustrated in the bottom left panel. As per the entries in the second row, a vehicle trajectory from first road segment identifier 414 to second road segment identifier 416 may be a U-Turn, but at a distance away from the location recorded in the first row. While the U-Turn trajectory recorded in the second row is near to the No U-Turn sign 420, that No U-Turn sign does not apply to U-Turns that are performed at this location. A driver monitoring system may still detect a putative alert based on the elapsed time between the detection of the No U-Turn sign and the detection of the U-Turn maneuver. If this occurs, however, an entry may be made into the database to indicate that there is no detectable or applicable U-Turn sign in that location. This may be encoded with a "None" entry for all columns associated with first road segment identifier 414 and second road segment identifier 416. In this way, a database system may be used to aid a navigation system not just to avoid U-Turns at locations where they are not permitted, but also to suggest U-Turns at nearby locations where U-Turns are permitted.

Figure 5:
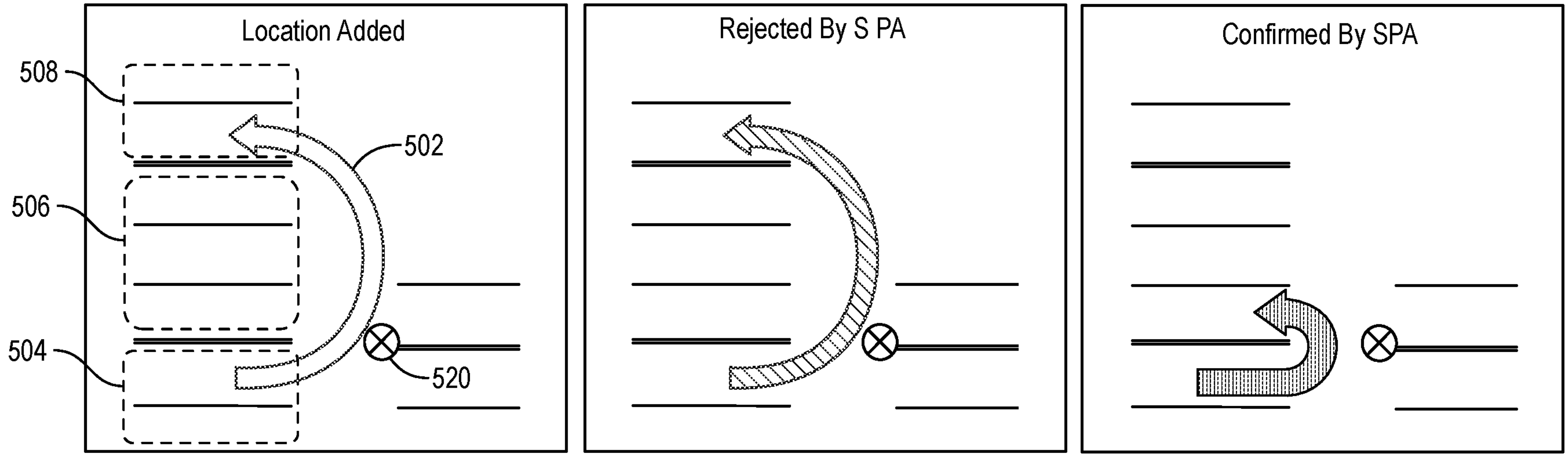
FIG. 5 is a schematic diagram and example database entries in accordance with certain aspects of the present disclosure.

FIG. 5 includes a database listing a first road segment identifier, a second road segment identifier, Applicable U-Turn Sign, and U-Turn Sign Type. First road segment identifier 504 and second road segment identifier 506 demonstrate a travel path where a U-Turn is not permitted, as No U-Turn sign 520 is applicable to the travel path. First road segment identifier 504 and second road segment identifier 504 demonstrate a travel path 502 onto a frontage road where No U-Turn Sign 508 is not applicable to the travel path. The No U-Turn sign would be applicable, however, to a travel path corresponding to a U-Turn from road segment identifier 504 to road segment identifier 506.

Figure 6:
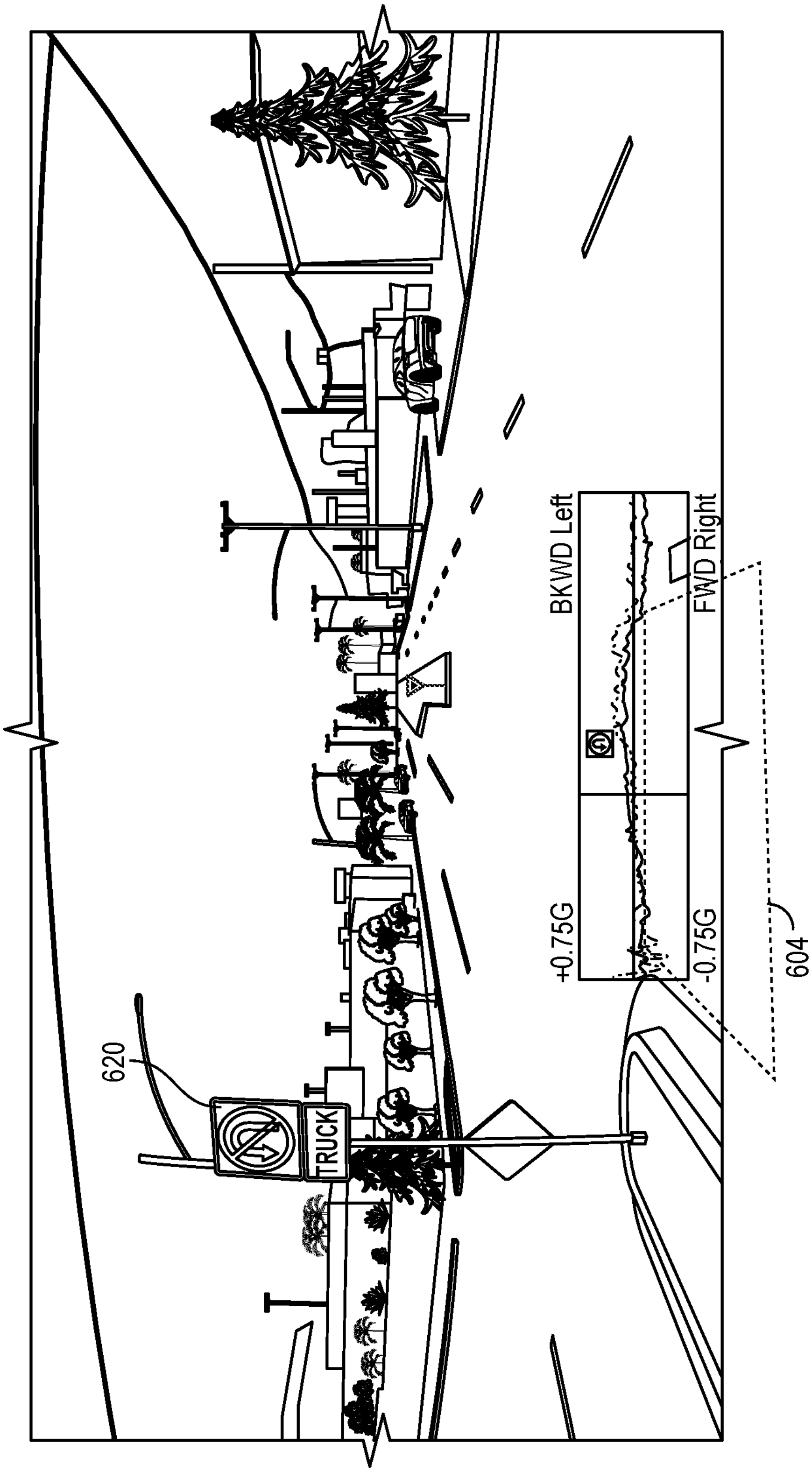
FIG. 6 is an image depicting a U-Turn event and a schematic diagram and example database entry in accordance with certain aspects of the present disclosure.

FIG. 6 includes a database listing first road segment identifier, second road segment identifier, Applicable U-Turn Sign, and U-Turn Sign Type, and Condition. As per the entries in the first row, a vehicle trajectory from first road segment identifier 604 to second road segment identifier 606 corresponds to a travel path where a U-Turn is conditionally prohibited, based on whether the operator's vehicle is a truck. In this example, a configuration parameter may indicate that the vehicle in which the driver monitoring device is mounted may be set to indicate a class of vehicle (car versus truck; or is_truck={True,False}) and based on this further information it may be determined whether to reject or confirm a putative U-Turn violation. Likewise, a navigational system may determine the appropriateness of a U-Turn for a vehicle by querying the database and in further reference to a vehicle class (such as truck, bus, etc) to which the vehicle belongs.

Figure 7:
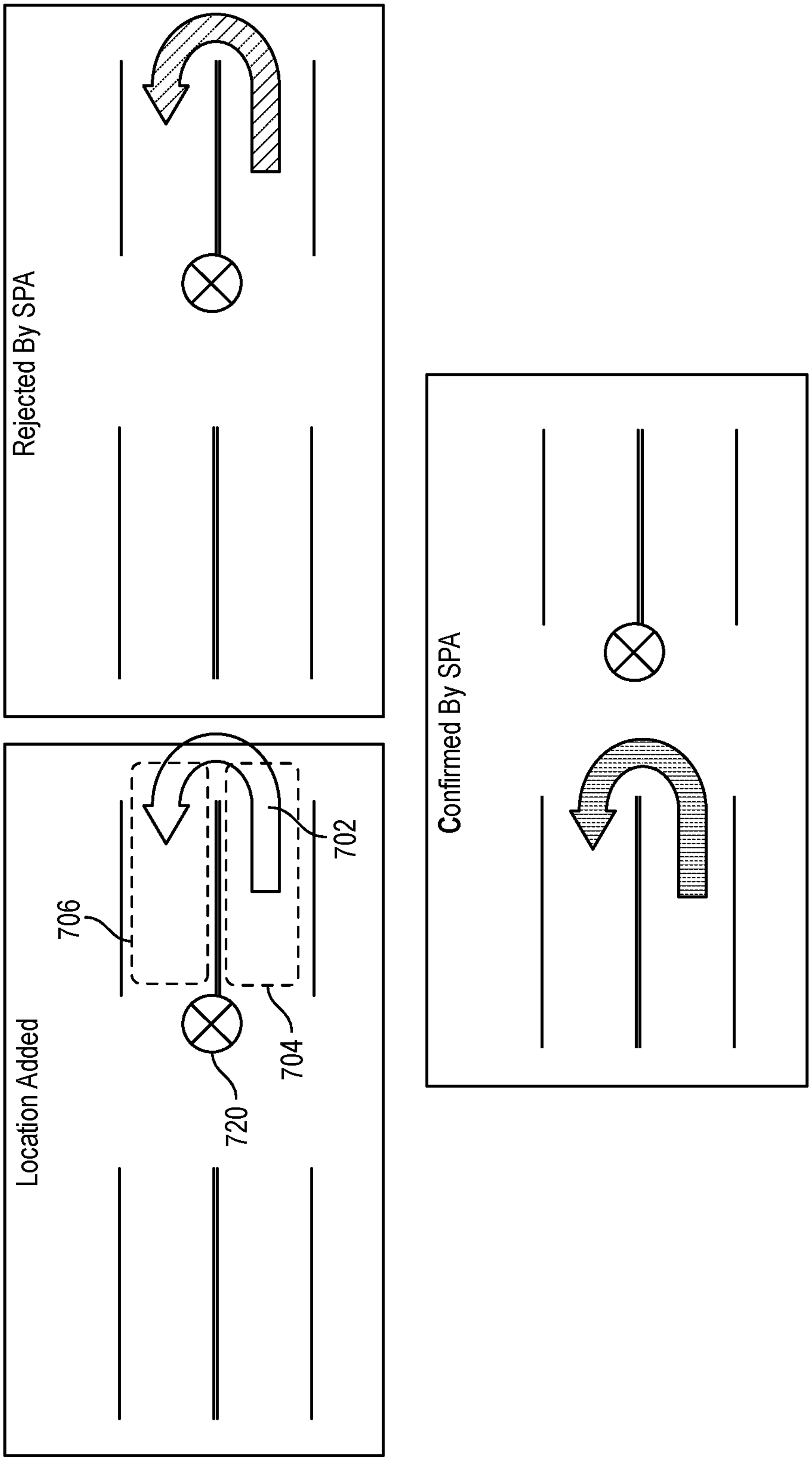
FIG. 7 is a schematic diagram and example database entries in accordance with certain aspects of the present disclosure.

FIG. 7 includes a database listing first road segment identifier, second road segment identifier, Applicable U-Turn Sign, and U-Turn Sign Type. As per the entries in the first row, a vehicle trajectory from first road segment identifier 704 to second road segment identifier 706 corresponds to a travel path 702 where a U-Turn is permitted, as the vehicle has traveled beyond the median and/or intersection that included No U-Turn sign 720. Like the bottom right panel of FIG. 4B, this example shows an example of a "Driver took U-Turn after travelling some distance from U-Turn sign" type of error.

Figure 8:
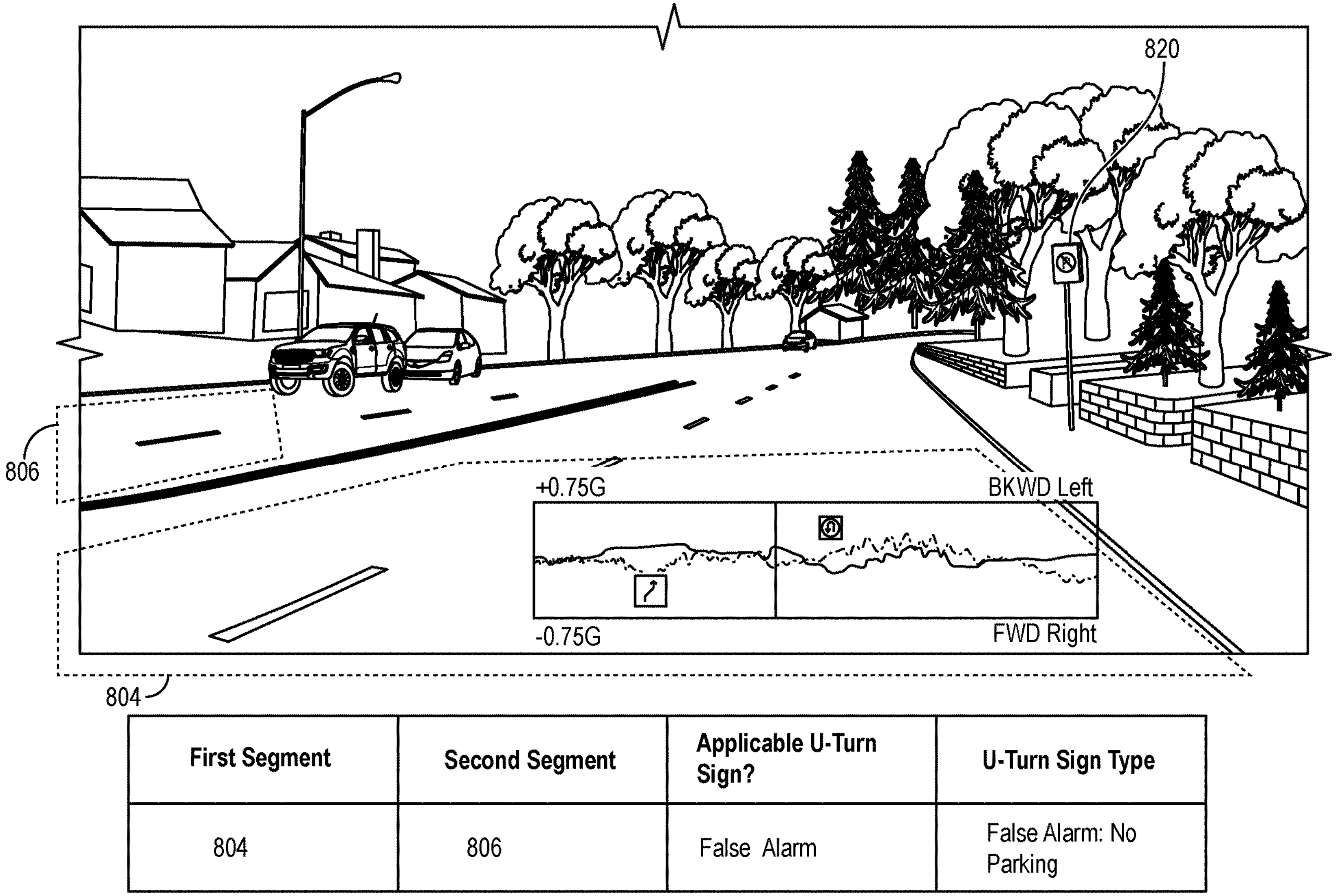
FIG. 8 is an image depicting a false alarm U-Turn event and a schematic diagram and example database entry in accordance with certain aspects of the present disclosure.

FIG. 8 includes a database listing First road segment identifier, second road segment identifier, Applicable U-Turn Sign, and U-Turn Sign Type. FIG. 8 further includes an image 804 captured from a camera that is mounted in the windshield of a vehicle in the rightmost lane. A No Parking sign 806 is detected within a sidewalk to the right of the vehicle's lane. There is no applicable No U-Turn sign and is a false alarm. This illustrates the utility of including within the geolocated database entries for traffic signs that have a visual appearance that is similar to the family of traffic signs of interest. In various conditions, such as low light, snow, and the like, the No Parking sign 806 could be more readily confused for a No U-Turn sign. Thus, it may be useful to maintain a record of false positives of these types so that a subsequent query to the database may confirm that this sign that was detected at that location, while similar in appearance to a No U-Turn sign, was in fact a different sign.

As used herein, the term "determining" encompasses a wide variety of actions. For example, "determining" may include calculating, computing, processing, deriving, investigating, looking up (e.g., looking up in a table, a database, or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for more precise classification of a road scene, comprising:

upon detecting that a vehicle performed a U-turn, detecting, by at least one processor of a computing device, a traffic control device in an image, wherein the image was captured by a camera while the vehicle performed the U-turn, and wherein the camera is mounted on or in the vehicle;

determining, by the at least one processor, a first segment identifier representing a first location of the vehicle based on a trajectory data of the vehicle;

querying, by the at least one processor, a U-turn sign database to produce a query result, wherein the query is based on the first road segment identifier representing the first location of the vehicle;

determining, by the at least one processor, that the detected traffic control device does not indicate U-turn permissibility at the first location based on the query result comprising an entry corresponding to the first location, wherein the entry indicates that a traffic control device at the first location does not indicate U-turn permissibility; and validating, by the at least one processor, the U-turn permissibility of the first location using the trajectory data of the vehicle and a sequence including at least one road segment having a second road segment identifier.

2. The method of claim 1, wherein each entry of the database comprises an indication of a type of traffic control device and a location; and wherein each indicated type of traffic control device in the database is a member of a group of traffic control devices that corresponds to U-turn-permissive signs, U-turn-impermissive signs, or visually similar non-U-turn traffic control devices.

3. The method of claim 2, wherein the group of traffic control devices comprises a plurality of types of traffic control devices that have a common visual feature in the types of traffic control device used in image-based traffic sign detection.

4. The method of claim 2, wherein the group of traffic control devices comprises traffic signs that indicate whether a U-Turn is permissible or impermissible.

5. The method of claim 1, wherein the query result comprises a data field indicating a condition, and wherein the method further comprises determining, by the at least one processor, whether the condition is satisfied by the vehicle at the first location.

6. The method of claim 5, wherein the condition specifies a time window, and wherein determining whether the condition is satisfied is based on the time at which the image was captured by the camera.

7. The method of claim 5, wherein the condition specifies a type of vehicle, and wherein determining whether the condition is satisfied is based on a class of vehicle to which the vehicle belongs.

8. The method of claim 1, further comprising:

generating, by the at least one processor, an alert to indicate that a U-Turn is or is not permissible at the first location.

9. The method of claim 1, further comprising:

determining, by the at least one processor, that the vehicle performed a U-Turn at the first location.

10. The method of claim 9, further comprising generating, by the at least one processor, an alert to indicate to a driver of the vehicle, wherein the alert indicates that the U-Turn that was performed was not permissible.

11. The method of claim 1, further comprising:

determining, by the at least one processor, a first road segment based on the first location; and wherein the query is based on the first road segment.

12. The method of claim 11, wherein an entry of the U-turn sign database comprises a first road segment identifier corresponding to the first road segment, a second road segment identifier corresponding to a second road segment, and an indication as to whether a U-Turn sign at the first location is applicable to a path of travel from the first road segment to the second road segment.

13. The method of claim 11, wherein the first road segment is determined based on a distance travelled by the vehicle after the image containing the traffic control device was captured.

14. The method of claim 1, further comprising:

selecting, by the at least one processor, the U-turn sign database from a set of databases based on at least one of the first location and the type of traffic control device.

15. The method of claim 1, wherein the traffic control device corresponds to a U-Turn sign and wherein the method further comprises:

detecting, by the at least one processor, that the vehicle performed a U-Turn, the U-Turn starting from a first road segment, the first road segment corresponding to the first location;

determining, by the at least one processor, a second location of the vehicle, the second location corresponding to a second road segment on which the U-Turn ended, wherein the first road segment has the first road segment identifier and the second road segment has the second road segment identifier.

16. The method of claim 15, wherein querying the database comprises:

querying the database to identify an entry that has a first data field including the first road segment identifier and a second data field including the second road segment identifier.

17. The method of claim 16, further comprising:

determining, by the at least one processor and based on a value of a third data field in the identified entry, whether the U-Turn is permissible or not permissible to a path of travel from the first road segment to the second road segment, the third data field indicating applicability of the U-Turn sign to the path of travel from the first road segment to the second road segment.

18. The method of claim 17, wherein determining whether the U-Turn is permissible or not permissible is further based on a fourth data field, the fourth data field indicating a condition related to the applicability of the U-Turn sign.

19. A computer program product comprising a non-transitory computer-readable medium having instructions stored thereon, the instructions being executable by one or more processors of a computing device configured to:

upon detecting that a vehicle performed a U-turn, detect a traffic control device in an image, wherein the image was captured by a camera while the vehicle performed the U-turn, and wherein the camera is mounted on or in the vehicle;

determine a first segment identifier representing a first location of the vehicle based on a trajectory data of the vehicle;

query a U-turn sign database to produce a query result, wherein the query is based on the first road segment identifier representing the first location of the vehicle;

determine that the detected traffic control device does not indicate U-turn permissibility at the first location based on the query result comprising an entry corresponding to the first location, wherein the entry indicates that a traffic control device at the first location does not indicate U-turn permissibility; and validate the U-turn permissibility of the first location using the trajectory data of the vehicle and a sequence including at least one road segment having a second road segment identifier.

* * * * *